United States Patent
Suzuki et al.

(10) Patent No.: US 8,996,820 B2
(45) Date of Patent: Mar. 31, 2015

(54) MULTI-CORE PROCESSOR SYSTEM, CACHE COHERENCY CONTROL METHOD, AND COMPUTER PRODUCT

(71) Applicant: Fujitsu Limited, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 13/712,816

(22) Filed: Dec. 12, 2012

(65) Prior Publication Data

US 2013/0097384 A1    Apr. 18, 2013

Related U.S. Application Data

(63) Continuation of application No. PCT/JP2010/060056, filed on Jun. 14, 2010.

(51) Int. Cl.
   *G06F 12/00*     (2006.01)
   *G06F 12/08*     (2006.01)

(52) U.S. Cl.
   CPC ........ *G06F 12/0815* (2013.01); *G06F 12/0837* (2013.01); *G06F 12/0842* (2013.01); *G06F 12/0831* (2013.01); *G06F 2212/1024* (2013.01); *G06F 2212/1028* (2013.01); *G06F 2212/171* (2013.01)
   USPC ............. 711/141; 711/E12.052; 711/E12.069

(58) Field of Classification Search
   USPC ....................................................... 711/141
   See application file for complete search history.

(56) References Cited

U.S. PATENT DOCUMENTS

| 5,303,362 A * | 4/1994 | Butts et al. ................ 711/121 |
| 6,122,712 A | 9/2000 | Torii |
| 2003/0014602 A1 | 1/2003 | Shibayama et al. |
| 2005/0021914 A1 | 1/2005 | Chung |

(Continued)

FOREIGN PATENT DOCUMENTS

| JP | 10-097465 A | 4/1998 |
| JP | 10-116192 A | 5/1998 |

(Continued)

OTHER PUBLICATIONS

Nakata, Y. "uITRON Firs, uITRON and Windows Understanding Difference of Embedded CE", pp. 1-6.

(Continued)

*Primary Examiner* — Reginald Bragdon
*Assistant Examiner* — Hamdy S Ahmed
(74) *Attorney, Agent, or Firm* — Arent Fox LLP

(57) ABSTRACT

A multi-core processor system includes a processor configured to establish coherency of shared data values stored in a cache memory accessed by a multiple cores; detect a first thread executed by a first core among the cores; identify upon detecting the first thread, a second thread under execution by a second core other than the first core and among the cores; determine whether shared data commonly accessed by the first thread and the second thread is present; and stop establishment of coherency for a first cache memory corresponding to the first core and a second cache memory corresponding to the second core, upon determining that no shared data commonly accessed is present.

6 Claims, 13 Drawing Sheets

(56) References Cited

U.S. PATENT DOCUMENTS

| | | |
|---|---|---|
| 2005/0210204 A1 | 9/2005 | Yamazaki |
| 2006/0294319 A1 | 12/2006 | Mansell |
| 2007/0005906 A1 | 1/2007 | Miyamoto |
| 2008/0022052 A1 | 1/2008 | Sakugawa |
| 2008/0263280 A1 | 10/2008 | Gara et al. |
| 2008/0263339 A1 | 10/2008 | Kriegel et al. |
| 2009/0031087 A1 | 1/2009 | Gaither et al. |
| 2009/0083488 A1 | 3/2009 | Madriles Gimeno et al. |
| 2009/0083493 A1 | 3/2009 | Kinter |

FOREIGN PATENT DOCUMENTS

| | | | |
|---|---|---|---|
| JP | 2000-207248 A | 7/2000 | |
| JP | 3139392 B2 | 2/2001 | |
| JP | 2002-007371 A | 1/2002 | |
| JP | 2003-030049 A | 1/2003 | |
| JP | 2004-133753 A | 4/2004 | |
| JP | 2005-044342 A | 2/2005 | |
| JP | 366164 B2 | 6/2005 | |
| JP | 2007-004802 A | 1/2007 | |
| JP | 2007-011580 A | 1/2007 | |
| JP | 2008-026944 A | 2/2008 | |
| JP | 2008-152571 A | 7/2008 | |
| JP | 4180569 B2 | 11/2008 | |
| JP | 2009-032264 A | 2/2009 | |

OTHER PUBLICATIONS uITRON Windows Embedded CE, May 13, 2010, pp. 1-4.
Japanese Office Action, Japanese Patent Application No. 2013-184347 dated May 13, 2014.
European Search Report, dated Nov. 27, 2014, issued in European Patent Application No. 10853202.9.
Kelm et al., "Cohesion: A Hybrid Memory Model for Accelerators", Proceedings of the 37th Annual International Symposium on Computer Architecture, Jan. 1, 2010, pp. 429-440.

* cited by examiner

FIG.8
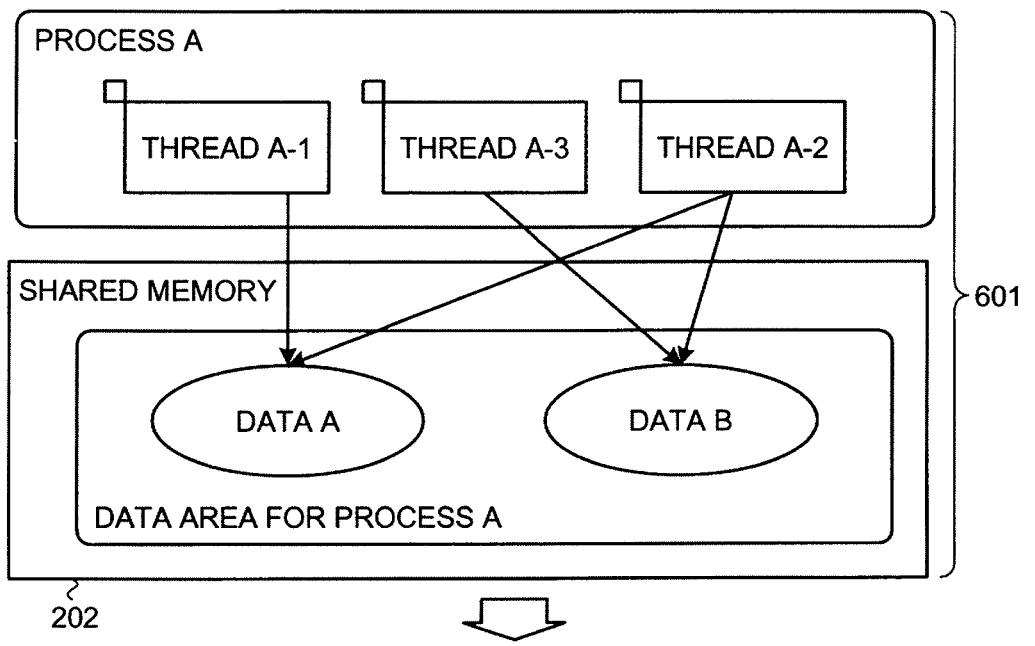
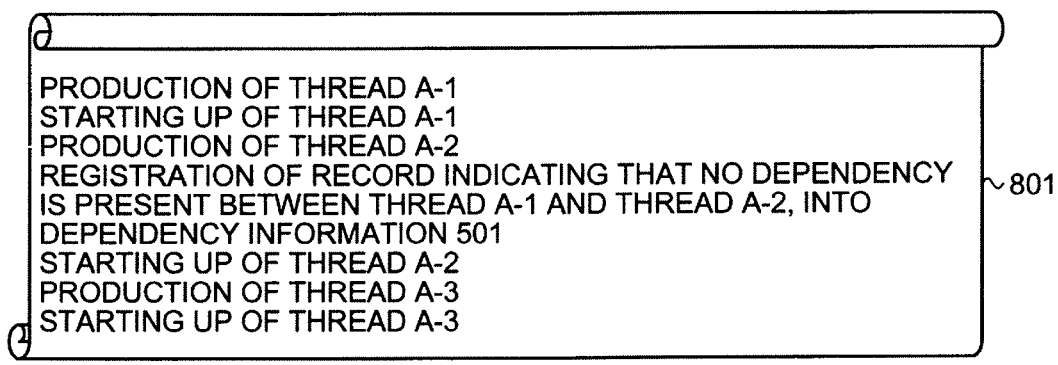

US 8,996,820 B2

MULTI-CORE PROCESSOR SYSTEM, CACHE COHERENCY CONTROL METHOD, AND COMPUTER PRODUCT

CROSS REFERENCE TO RELATED APPLICATIONS

This application is a continuation application of International Application PCT/JP2010/060056, filed on Jun. 14, 2010 and designating the U.S., the entire contents of which are incorporated herein by reference.

FIELD

The present invention relates to a multi-core processor system, a cache coherency control method, and a cache coherency control program that control a cache coherency mechanism.

BACKGROUND

Recently, multi-core processor systems have taken a form where an independent cache memory is disposed for each core to maintain coherency of the cache memories using a cache coherency mechanism. Hardware executes maintenance of coherency of shared data stored in the cache memories in the multi-core processor system utilizing a cache coherency mechanism and therefore, parallel software for a multi-core processor can be created easily.

The cache coherency mechanism monitors operations of the cache memories and therefore, delay occurs with each access of the cache memory. A technique has been disclosed in which the cache coherency mechanism is controlled based on symmetric multi processing (SMP) or asymmetry multi processing (ASMP) to prevent delay (see, e.g., Japanese Laid-Open Patent Publication No. H10-97465). According to Japanese Laid-Open Patent Publication No. H10-97465, the SMP is employed when plural cores execute plural processes and the ASMP is employed when plural cores execute a single process. A "process" is an execution unit of a program and one or more threads belong to one process. Threads belonging to the same process access the same memory space.

Another technique has been disclosed in which the maintenance of coherency is executed when plural cores execute threads belonging to the same process; and the maintenance of coherency is not executed when the plural cores execute threads each belonging to different processes, respectively (see, e.g., Japanese Laid-Open Patent Publication No. 2004-133753).

A further technique of analyzing dependency relations among threads has been disclosed that generates information indicating access of shared data by executing each thread for each statement and thereby analyzes a dependency relation for each statement of the thread (see, e.g., Japanese Laid-Open Patent Publication No. 2000-207248).

According to the techniques disclosed in the Japanese Laid-Open Patent Publication Nos. H10-97465 and 2004-133753, whether coherency is to be maintained is determined for each process. When numerous functions are not used concurrently such as in an embedded device, coherency is often maintained for a single process. Therefore, even when the techniques according to Japanese Laid-Open Patent Publication Nos. H10-97465 and 2004-133753 are applied to an embedded device, processing to maintain coherency is always executed, whereby operations of the cache coherency mechanism increase. Therefore, problems arise in that delay occurs in the access of the cache memory and increased power consumption results.

When the technique according to Japanese Laid-Open Patent Publication No. 2000-207248 is used, access information of the shared data is analyzed for each statement and therefore, the cache coherency mechanism is controlled for each statement. Consequently, a problem arises in that the number of control sessions significantly increases.

SUMMARY

According to an aspect of an embodiment, a multi-core processor system includes a processor configured to establish coherency of shared data values stored in a cache memory accessed by multiple cores; detect a first thread executed by a first core among the cores; identify upon detecting the first thread, a second thread under execution by a second core other than the first core and among the cores; determine whether shared data commonly accessed by the first thread and the second thread is present; and stop establishment of coherency for a first cache memory corresponding to the first core and a second cache memory corresponding to the second core, upon determining that no shared data commonly accessed is present.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram for explaining a method of registering dependency information 501;

DESCRIPTION OF EMBODIMENTS

Preferred embodiments of a multi-core processor system, a cache coherency control method, and a cache coherency control program according to the present invention are described in detail below with reference to the accompanying drawings.

Figure 1:
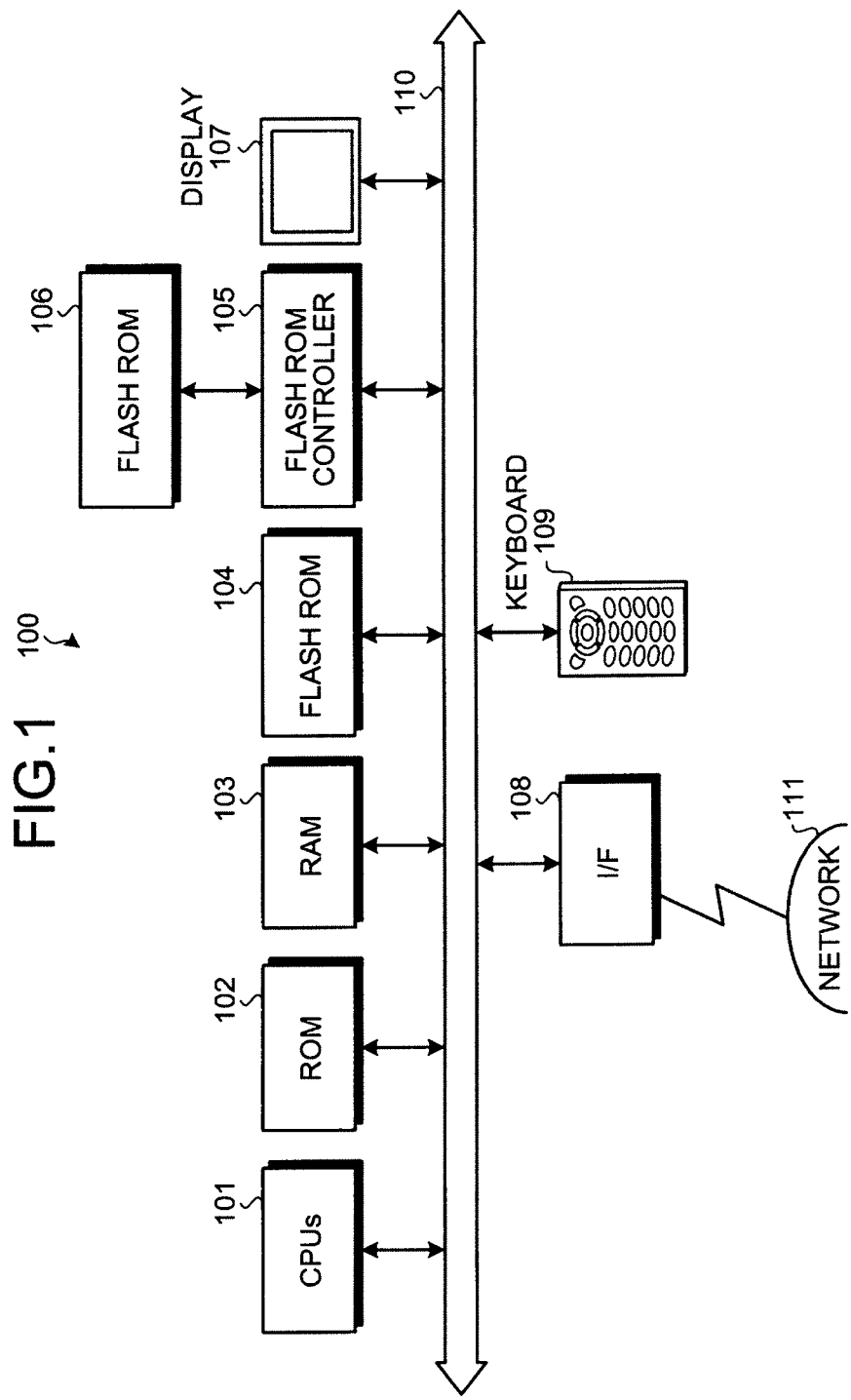
FIG. 1 is a block diagram of a hardware configuration of a multi-core processor system 100 according to an embodiment.

FIG. 1 is a block diagram of a hardware configuration of a multi-core processor system 100 according to an embodiment. As depicted in FIG. 1, the multi-core processor system 100 includes multiple central processing units (CPUs) 101, read-only memory (ROM) 102, random access memory (RAM) 103, flash ROM 104, a flash ROM controller 105, and flash ROM 106. The multi-core process system includes a display 107, an interface (I/F) 108, and a keyboard 109, as input/output devices for the user and other devices. The components of the multi-core system 100 are respectively connected by a bus 110.

The CPUs 101 govern overall control of the multi-core processor system 100. The CPUs 101 refer to CPUs that are single core processors connected in parallel. Details of the CPUs 101 will be described hereinafter with reference to FIG. 2. Further, the multi-core processor system 100 is a system of computers that include processors equipped with multiple cores. Provided that multiple cores are provided, implementation may be by a single processor equipped with multiple cores or a group of single-core processors in parallel. In the present embodiments, for simplicity, description will be given taking single-core processor CPUs connected in parallel as an example.

The ROM 102 stores therein programs such as a boot program. The RAM 103 is used as a work area of the CPUs 101. The flash ROM 104 stores system software such as an operating system (OS), and application software. For example, when the OS is updated, the multi-core processor system 100 receives a new OS via the I/F 108 and updates the old OS that is stored in the flash ROM 104 with the received new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data received by the user of the multi-core processor system 100 through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input and output of data with respect to external apparatuses. For example, a modem or a LAN adaptor may be employed as the I/F 108. The keyboard 109 includes, for example, keys for inputting letters, numerals, and various instructions and performs the input of data. Alternatively, a touch-panel-type input pad or numeric keypad, etc. may be adopted.

Figure 2:
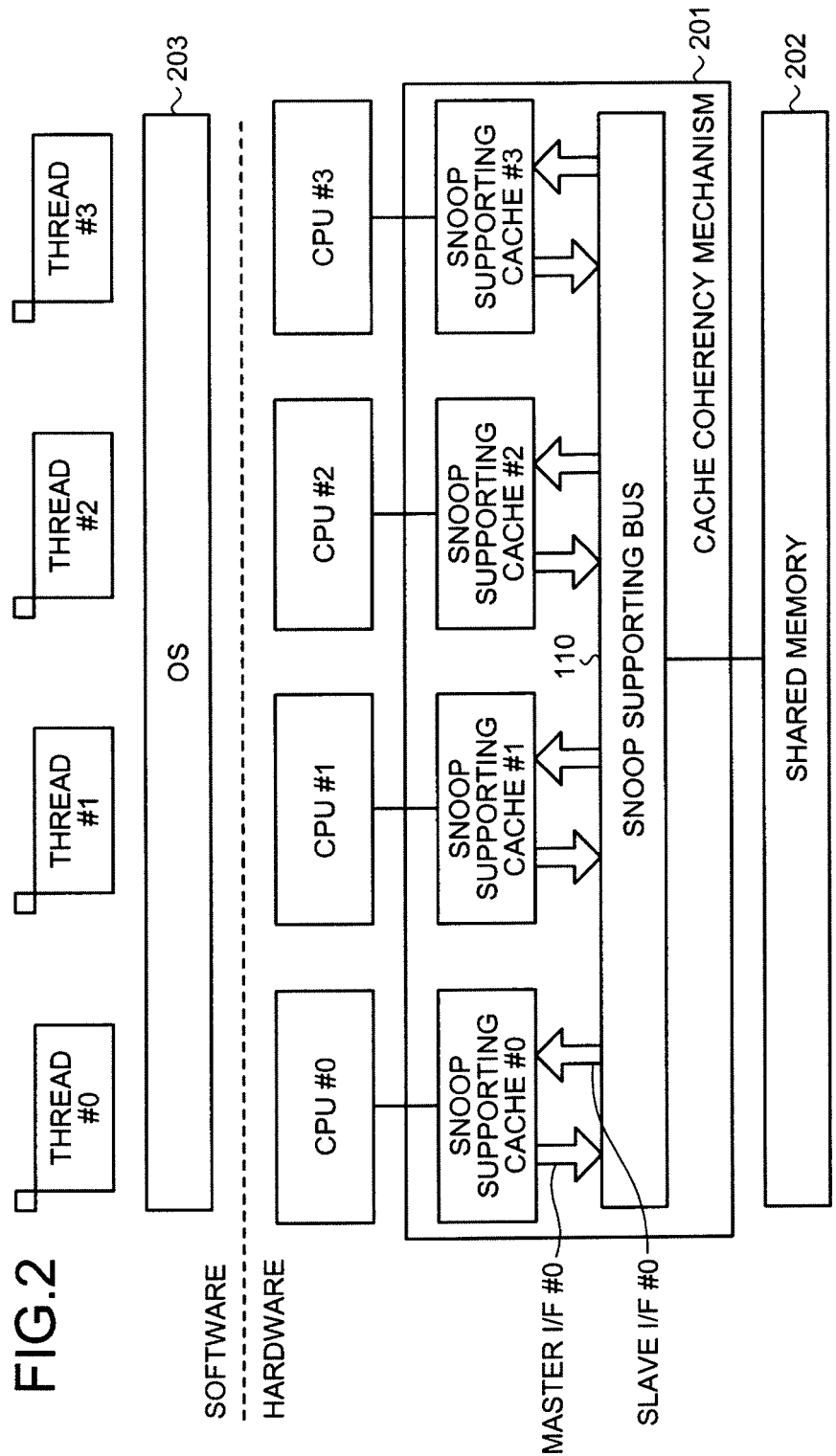
FIG. 2 is a block diagram of a portion of the hardware, and software of the multi-core processor system 100.

FIG. 2 is a block diagram of a portion of the hardware, and software of the multi-core processor system 100. The hardware depicted in FIG. 2 includes a cache coherency mechanism 201, a shared memory 202, and CPUs #0 to #3 that are included among the CPUs 101. The shared memory 202 and the CPUs #0 to #3 are connected respectively by the cache coherency mechanism 201. The CPUs #0 to #3 each retain a cache memory having data therein that is copied from data in the shared memory 202 to enable high-speed access of the data stored in the shared memory 202. The cache memories of the CPUs #0 to #3 in the embodiment are present inside the cache coherency mechanism 201.

The cache coherency mechanism 201 is an apparatus that establishes/maintains coherency among the cache memories accessed by the CPUs #0 to #3. Schemes employed by the cache coherency mechanism are roughly classified into a snoop scheme and a directory scheme.

The snoop scheme is a scheme for a cache memory to manage update states of the cache memory of the cache coherence mechanism and cache memories of other CPUs and to exchange information concerning the update states with the other cache memories. A cache coherency mechanism employing the snoop scheme determines which cache memory has the latest data, by exchanging the information concerning the update states. The cache coherency mechanism employing the snoop scheme changes the state of the cache memory of the cache coherency mechanism and executes invalidation for the cache memories, so that the cache memories can acquire the latest data.

The directory scheme is a scheme for coherency of the cache memories to be centrally managed in a dedicated area that is referred to as a "directory". The cache coherency mechanism employing the directory scheme sends data from the cache memories to the directory and whereby, all the cache memories share the data.

In either of the schemes, the cache coherency mechanism 201 determines whether the cache memory of each CPU coincides with the shared memory 202, which is the main storage. If the cache coherency mechanism 201 determines that the cache memories and the shared memory 202 do not coincide, the cache coherency mechanism 201 resolves the incoherency by executing copying, updating, invalidating, etc., of the cache memories to establish/maintain coherency. The cache coherency mechanism 201 in the embodiment will be described assuming that the cache coherency mechanism 201 employs the snoop scheme. However, the embodiment is also applicable to the cache coherency mechanism 201 if the directory scheme is employed.

Snoop supporting caches #0 to #3 and a snoop supporting bus 110 are present in the cache coherency mechanism 201. The CPUs #0 to #3 respectively access the corresponding snoop supporting caches #0 to #3. For example, the CPU #0 accesses the snoop supporting cache #0. The snoop supporting caches will be described in detail with reference to FIG. 3.

The snoop supporting bus 110 is a bus that in addition to the functions of a conventional bus, has functions to support the snoop scheme. The snoop supporting bus 110 will be described in detail with reference to FIG. 4. The snoop supporting cache #0 is connected to the snoop supporting bus 110 by a master I/F #0 and a slave I/F #0. Similarly, the snoop supporting caches #1 to #3 are also connected to the snoop supporting bus 110 by respective master I/Fs and slave I/Fs.

The shared memory 202 is a storage area accessed by the CPUs #0 to #3. The "storage area" is, for example, the ROM 102, the RAM 103, or the flash ROM 104.

The software depicted in FIG. 2 includes an OS 203 and threads #0 to #3. The OS 203 is a program that controls the multi-core processor system 100. For example, the OS 203 executes a scheduling process for software executed by the CPUs #0 to #3. The threads #0 to #3 are threads that are assigned to the CPUs #0 to #3 by the OS 203. The threads #0 to #3 may belong to the same process or may each belong to different processes.

Figure 3:
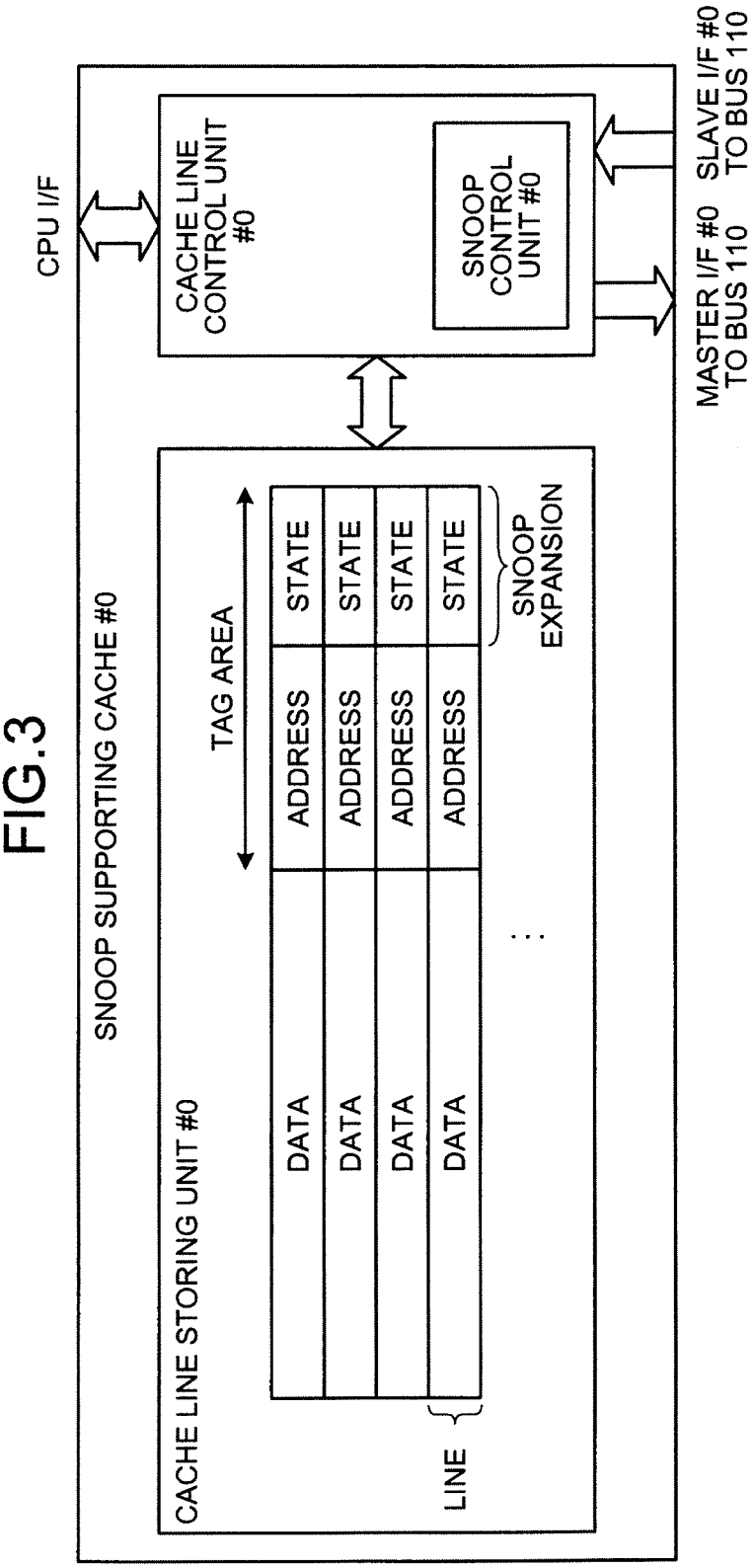
FIG. 3 is a block diagram of the inside of a snoop supporting cache #0.

FIG. 3 is a block diagram of the inside of the snoop supporting cache #0. The inside of the snoop supporting cache will be described with reference to FIG. 3 and taking the snoop supporting cache #0 among the snoop supporting caches #0 to #3 as an example.

The snoop supporting cache #0 includes a cache line storing unit #0 and a cache line control unit #0. The cache line storing unit #0 includes a data field, an address field, and a state field. The data field stores continuous data in a data unit called a "line", which is about several dozen bytes. The address field stores addresses on the shared memory 202 and corresponding to the lines stored in the data field. The state field stores the state of the data field. The address field and the state field are collectively referred to as a "tag area".

The state that the state field can take differs depending on the protocol that realizes the snoop scheme. However, typical states include the four states of an "M state", an "E state", an "S state", and an "I state".

The M state represents a state where the corresponding line is present only in the corresponding cache memory and is changed from the main storage. The E state represents a state where the corresponding line is present only in the corresponding cache memory and is not changed from the main memory. The S state represents a state where the corresponding line is present in plural cache memories and is not changed from the main storage. The I state represents a state where the corresponding line is invalid. A protocol is also present that uses an "O state" that is different from the other four states and that represents a state where the corresponding line is present in plural cache memories and the corresponding line is updated. This protocol is responsible for writing the line back into the main storage.

The protocols to realize the snoop scheme are present and are roughly classified into invalid-type protocols and update-type protocols. The invalid-type protocol is a protocol that, when a cache memory updates an address that is referred to by plural cache memories, determines that the address is dirty and invalidates the corresponding line in all the caches currently referring to the address. The update-type protocol is a protocol that, when data is updated of an address referred to by plural cache memories, notifies the main storage and other cache memories of the updated data.

An example of the invalid-type protocol is an MESI (Illinois) protocol that takes the four states of the M state, the E state, the S state, and the I state; and an MOSI (Berkeley) protocol that takes the four states of the M state, the O state, the S state, and the I state. An example of the update-type protocol is an MEI (Firefly) protocol that takes the three states of the M state, the E state, and the I state; and an MOES (DRAGON) protocol that takes the four states of the M state, the O state, the E state, and the S state.

In the embodiment, the description will be made taking an example of the MESI protocol that is an invalid-type protocol. However, the embodiment is applicable to any other invalid-type protocol and to an update-type protocol.

The cache line control unit #0 has various functions that are required for realizing functions of the cache memory such as a data storage structure determining process, a line transposing process, and a data updating process. The cache line control unit #0 is connected to the corresponding CPU #0 by a CPU I/F and to the bus 110 by the master I/F #0 and the slave I/F #0.

The cache line control unit #0 includes a snoop control unit #0 to support the snoop. The snoop control unit #0 has a function of controlling the cache line storing unit #0 according to the protocol implementing the snoop scheme. The snoop control unit #0 in the embodiment controls the cache line storing unit #0 according to the MESI protocol. The snoop control unit #0 executes a process of newly fetching a cache line and a process of writing into a cache line. These two processes will be described later with reference to FIGS. 10 and 11.

The snoop supporting caches are provided one-to-one with respect to the CPUs #0 to #3 and therefore, the cache line storing units and the cache line control units that are internal structures of the snoop supporting caches are also provided one-to-one with respect to the CPUs. For example, the cache line storing unit #1 represents the cache line storing unit of the snoop supporting cache #1. The cache line storing units #2 and #3 also respectively correspond to the snoop supporting caches #2 and #3. The cache line control units and the snoop control units corresponding to these reference numerals similarly correspond accordingly.

Figure 4:
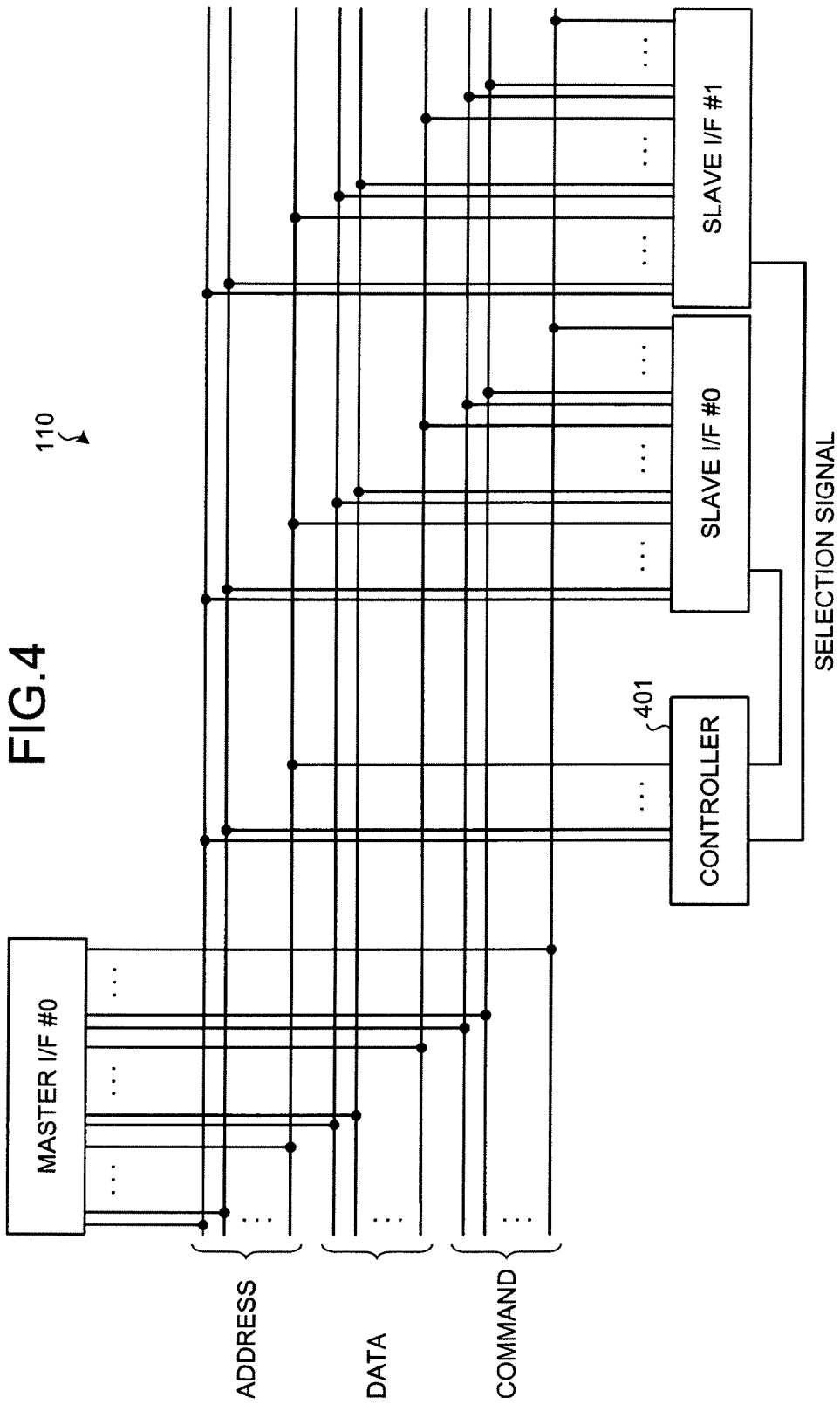
FIG. 4 is a diagram for explaining details of a bus 110 supporting snoop.

FIG. 4 is a diagram for explaining details of the bus 110 supporting snoop. Each line in FIG. 4 is a physical signal line and a black point thereon represents a connection of the signal lines. The bus 110 receives signals from the master I/Fs #0 to #3 and the slave I/Fs #0 to #3. The master I/Fs each send address information and command information that indicates whether a command is for reading or writing. A controller 401 outputs a selection signal to the corresponding slave I/F based on the address information and mapping information that is registered in advance in the controller 401. The slave I/F receives the selection signal as well as the address information and the command information, and exchanges data according to the command information.

In the example depicted in FIG. 4, the signal sent by the master I/F #0 is received by the controller 401. The controller 401 outputs the selection signal to, for example, the slave I/Fs #1 to #3. The slave I/Fs #1 to #3 each receive the selection signal as well as the address information and the command information, and exchange data according to the command information.

The bus 110 supporting snoop has three additional functions including broadcasting, blocking, and invalidating. "Broadcasting" is a function of sending a request for a combination of the command information and data information from the master I/F to all the slave I/Fs that are set in advance as broadcasting destinations. "Blocking" is a function of forcibly cancelling the current bus connection. "Invalidating" is a function of invalidating the line corresponding to an address for cache memory. By using these functions, the bus 110 fulfills the functions required as the cache coherency mechanism.

Figure 5:
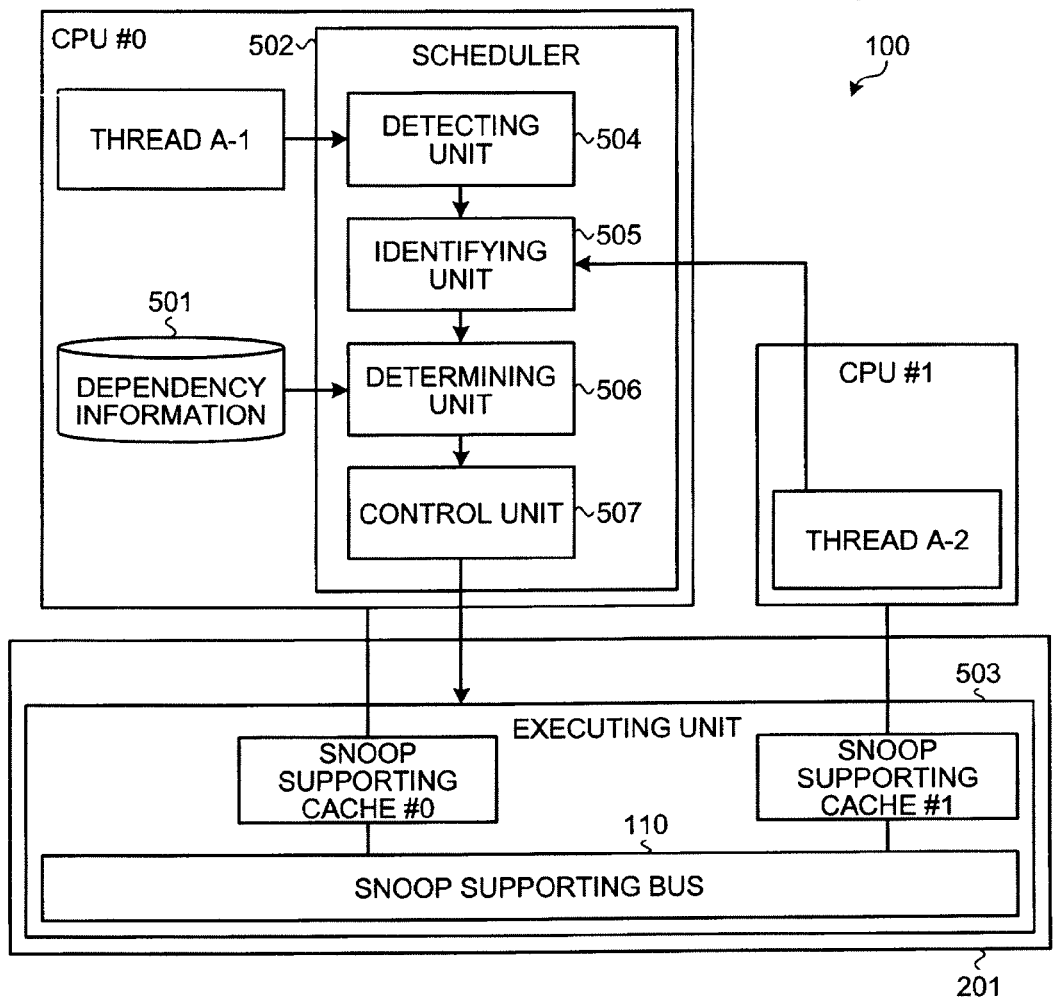
FIG. 5 is a block diagram of functions of the multi-core processor system 100.

Functions of the multi-core processor system 100 will be described. FIG. 5 is a block diagram of the functions of the multi-core processor system 100. The multi-core processor system 100 includes an executing unit 503, a detecting unit 504, an identifying unit 505, a determining unit 506, and a control unit 507. These functions constituting a control unit (units from the detecting unit 504 to the control unit 507) are implemented by an execution of programs stored in the storing apparatus on, for example, the CPU #0. The storing apparatus is, for example, the ROM 102, the RAM 103, or the flash ROM 104 depicted in FIG. 1. The executing unit 503 is implemented by an execution of a program by the cache coherency mechanism 201.

The multi-core processor system 100 can access dependency information 501 that includes a list of threads that do not access the same shared data as an arbitrary thread, and an inter-process communication area that is not accessed by the arbitrary thread. The dependency information 501 will be described in detail with reference to FIG. 9.

The units from the detecting unit 504 to the control unit 507 may be present as internal functions in a scheduler 502, or may be present outside the scheduler 502, in a state enabling notification of processing results of the scheduler 502. The scheduler 502 is software included in the OS 203 and has a function of determining processes to be assigned to the CPUs. In FIG. 5, the units from the detecting unit 504 to the control unit 507 are present inside the CPU #0. However, the units may be present in any one of the CPUs #1 to #3, or may be present in each of the CPUs #0 to #3.

For example, the scheduler 502 determines threads to be assigned to the CPUs based on priority, etc., set in each of the threads. At a predetermined time, the scheduler 502 assigns to the CPUs, the threads whose dispatchers are determined. The scheduler may include a dispatcher function. In the embodiment, the dispatcher function is present in the scheduler 502.

The executing unit 503 has a function of establishing coherency among values of the shared data stored in the cache memory accessed by the plural cores. For example, the cache coherency mechanism 201 is the executing unit 503 and establishes coherency among the values of the shared data in the snoop supporting cache #0 accessed by the CPU #0 and the snoop supporting cache #1 accessed by the CPU #1.

The detecting unit 504 has a function of detecting a first thread executed by a first core among the cores. For example, the detecting unit 504 detects a thread A-1 executed by the CPU #0 that is the first core. For example, the timing at which the thread A-1 is detected is the time when the scheduler 502 executes a re-scheduling request of the thread. Information concerning the detected thread is stored in a register, a local memory, etc., of the CPU #0.

The identifying unit 505 has a function of identifying among the cores when the detecting unit 504 detects the first thread, a second thread under execution by a second core other than the first core. For example, when the thread A-1 is detected, the identifying unit 505 identifies a thread A-2 under execution by, for example, the CPU #1 other than the CPU #0 among the CPUs #0 to #3. Information concerning the identified thread is stored to the register, the local memory, etc., of the CPU #0.

The determining unit 506 has a function of determining whether shared data is present that is commonly accessed by the first thread and the second thread that is identified by the identifying unit 505. The determining unit 506 may further determine whether the first and the second threads belong to the same process. The determining unit 506 may determine whether the first and the second threads each belong to a process that is different from that of each other and whether an area is present that is for communication among processes and commonly used by the first and the second threads. The area for communication among the processes will be described in detail with reference to FIG. 8.

The determining unit 506 may determine whether an area is present for communication among processes to be used by the processes to which the first and the second threads belong. When the determining unit 506 determines whether any area is present that is for communication among processes and is commonly used, the determining unit 506 may first determine the state where at least one of the first and the second threads does not use the inter-process communication area. When the first and the second threads both use the inter-process communication area, the determining unit 506 may determine whether an area is present that is for communication among processes and that is commonly used by the first and the second threads.

For example, the determining unit 506 accesses the dependency information 501; determines whether the second thread is included in the list of the threads that do not access the same shared data of the first thread; and depending on the result thereof, determines whether any shared data is present that is commonly accessed by the threads. The determining unit 506 may access the dependency information 501 and determine from among areas among processes not accessed by the first and the second threads, whether an area is present that is commonly used for communication among processes. The result of the determination is stored in the register, the local memory, etc., of the CPU #0.

The control unit 507 has a function of causing the executing unit 503 to stop establishing coherency between the first and the second cache memories respectively corresponding to the first and the second cores, when the determining unit 506 determines that no shared data that is commonly accessed is present. The control unit 507 may cause the establishment of coherency to be stopped for the first and the second cache memories when the determining unit 506 determines that the first and the second threads belong to the same process and no shared data that is commonly accessed is present. The control unit 507 may cause the establishment of coherency to be stopped for the first and the second cache memories when the determining unit 506 determines that the first and the second threads each belong to a process different from that of each other and no area is present that is commonly used for communication among processes.

When the control unit 507 causes the establishment of coherency to be stopped for the first and the second cache memories, the control unit 507 may cause the shared data stored in the first cache memory to be deleted from the first cache memory.

For example, a case is assumed where the determining unit 506 determines that no shared data is present that is commonly accessed by the threads A-1 and A-2. In this case, the control unit 507 causes the establishment of coherency to be stopped for the snoop supporting caches #0 and #1, using the cache coherency mechanism 201. The control unit 507 flashes the shared data stored in the snoop supporting cache #0 and thereby, deletes the shared data from the snoop supporting cache #0. A flashing operation will be described in detail with reference to FIG. 12.

Figure 6:
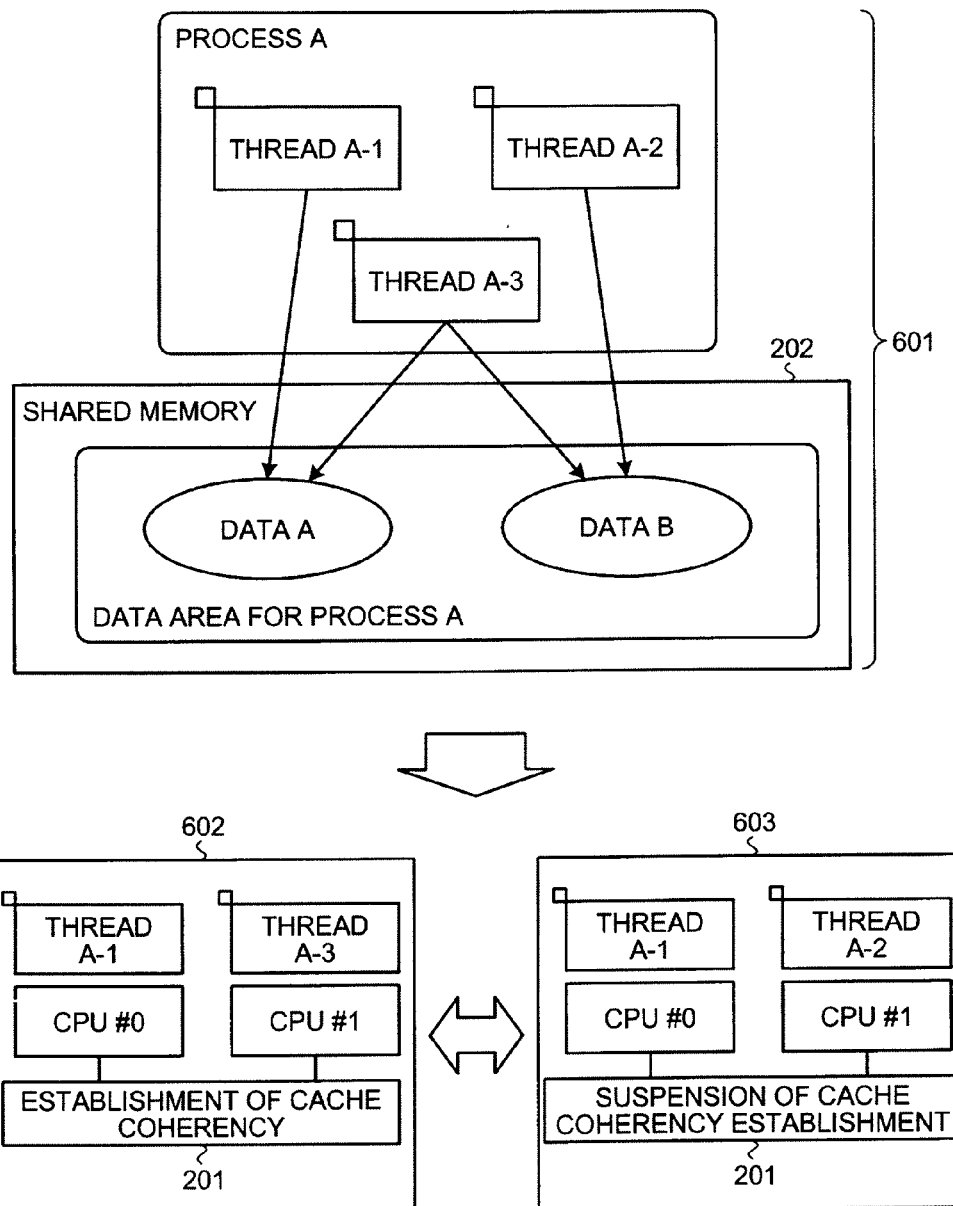
FIG. 6 is a diagram for explaining an execution state and a suspended state of cache coherency.

FIG. 6 is a diagram for explaining an execution state and a suspended state of cache coherency. Reference numeral "601" depicts the threads retained by a process "A" operating in the multi-core processor system 100 and the memory accessed by the threads. The process A retains the threads A-1, A-2, and A-3. The thread A-1 accesses data "A" in a data area for the process A of the shared memory 202. The thread A-2 accesses data B. The thread A-3 accesses the pieces of data A and B.

Based on the premise denoted by the reference numeral 601, the thread A-1 is assigned to the CPU #0 and the thread A-3 is assigned to the CPU #1 in the multi-core processor system 100 depicted by reference numeral "602". In the state denoted by the reference numeral "602", the cache coherency mechanism 201 executes the establishment of cache coherency and thereby, the CPUs #0 and #1 can share the data A in a coherent state.

The multi-core processor system 100 denoted by a reference numeral "603" depicts a state where the thread assigned to the CPU #1 is switched from the thread A-3 to the thread A-2, i.e., switched from the state indicated by reference numeral "602". In the state indicated by reference numeral "603", the CPUs #0 and #1 has no commonly accessed data and therefore, the cache coherency mechanism 201 may cause the establishment of cache coherency to be stopped. To invalidate the cache coherency, for example, the suspension of the establishment of cache coherency is implemented by excluding the caches from among the broadcast destinations when broadcast transmission is executed, using the bus 110 supporting snoop described above with reference to FIG. 4.

A method of invalidation may be a method according to which the broadcast is stopped to the snoop supporting caches #0 and #1 using the bus 110. For example, when the cache coherency mechanism 201 broadcasts an invalidation notification, etc., from the master I/F #0 of the snoop supporting cache #0, the cache coherency mechanism 201 does not transmit the invalidation notification, etc., to the slave I/F #1 but transmits to the slave I/Fs #2 and #3. In this manner, when the cache coherency mechanism 201 causes the establishment of cache coherency between specific CPUs to be stopped, the transmission destinations are decreased. Therefore, the amount of traffic and the amount of processing by the bus 110 can be reduced. Consequently, power consumption can be reduced and delay can be prevented.

Figure 7:
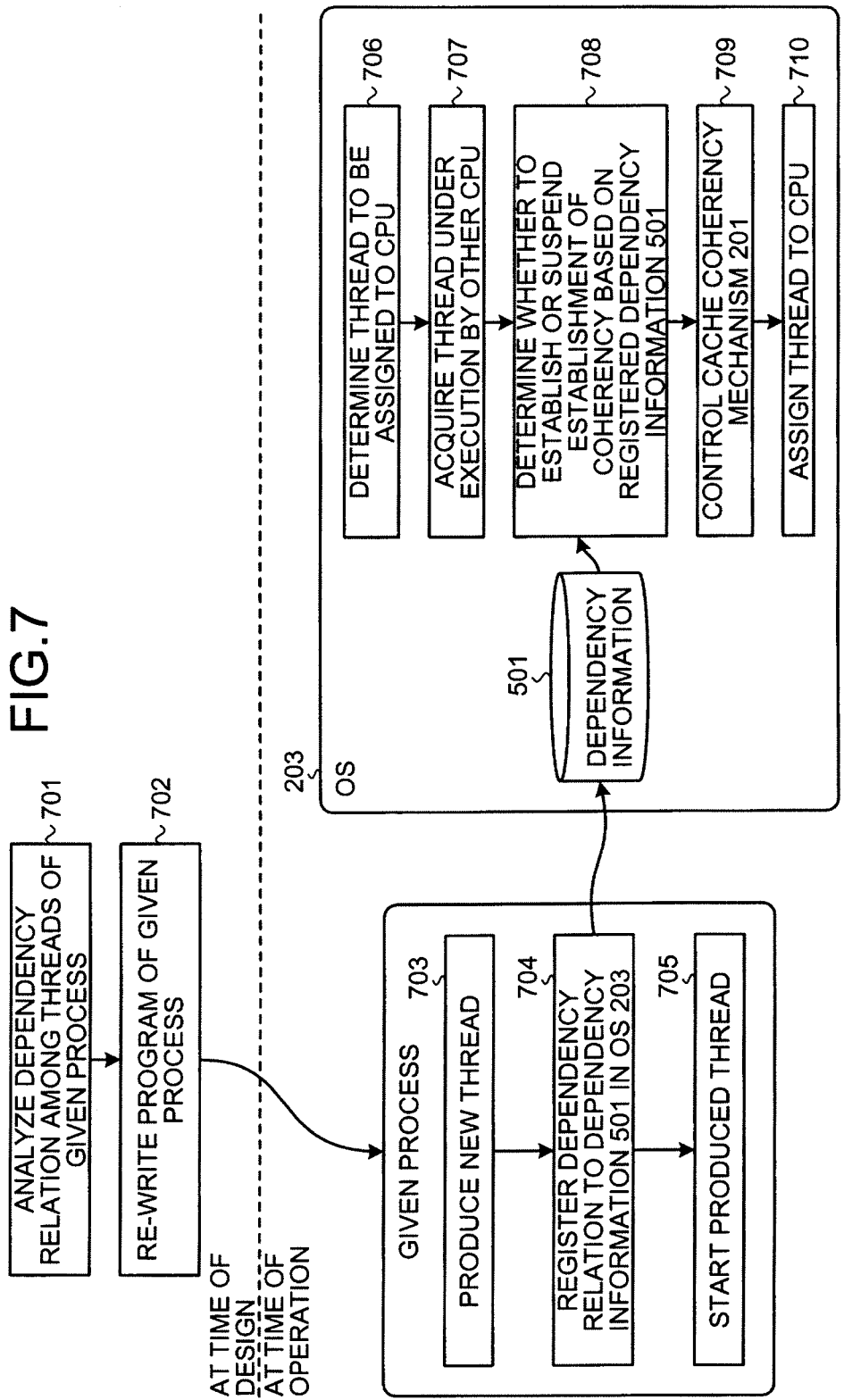
FIG. 7 depicts an overview of operation of the multi-core processor system 100.

FIG. 7 depicts an overview of operation of the multi-core processor system 100. FIG. 7 depicts process steps 701 to 710 as a process step group to implement switching between the execution and the suspension of the cache coherency mechanism 201 based on the shared data accessed by the threads, described with reference to FIG. 6. Process steps 701 and 702 are executed when the multi-core processor system 100 is designed. Process steps 703 to 710 are executed during the operation of the multi-core processor system 100.

At process step 701, the dependency relation between the threads belonging to a process to be executed is analyzed by an electronic system level (ESL) simulator, etc. An example of the analysis will be described with reference to FIG. 8. After the analysis, at process step 702, a program that is the origin of the process to be executed is rewritten by a compiler. For example, the compiler adds information concerning the thread having a dependency relation with a given thread to the program, at the head of the given thread, etc.

At process step 703, the CPU to execute the process to be executed newly produces a thread. After the production, at process step 704, the CPU adds the information of the dependency relation added by the compiler, to the dependency information 501 in the OS 203. The dependency information 501 will be described in detail with reference to FIG. 9. After the addition, the process to be executed requests the OS 203 for an assignment of a thread, and at process step 705, the CPU whose thread assignment is determined by the scheduler 502 in the OS 203 executes the thread produced.

At process step 706, the scheduler 502 of the OS 203 determines the thread to be assigned to the CPU. The thread is determined from among the threads produced at process step 703 and the threads that are executable. After determining the thread, at process step 707, the scheduler 502 acquires a thread under execution by another CPU.

After acquiring, at process step 708, the thread under execution, the scheduler 502 determines whether to establish coherency or suspend establishment of coherency, based on the registered dependency information 501. After the determination at process step 709, the scheduler 502 controls the cache coherency mechanism 201 according to the result of the determination. After the control at process step 710, the scheduler 502 assigns the determined thread to the CPU. Process steps 706 to 710 will be described in detail with reference to FIGS. 12 and 13.

FIG. 8 is a diagram for explaining a method of registering the dependency information 501. FIG. 8 depicts the method of registering the dependency information 501 for the process A denoted by the reference numeral "601". When the multi-core processor system 100 is designed, the ESL simulator surveys for the threads in the process A that executes a thread parallel process, the data area used by each of the threads.

The survey method can be a static approach of acquiring a data area to be used, by analyzing source code or a dynamic approach of acquiring a data area to be used by the thread, from a record of memory access by actually executing the thread. If comprehensive analysis of the data area for the threads is difficult, a combination of threads may be recorded for which, as a result of the survey, no data area is apparently shared therebetween.

In addition to the survey of the sharing of the data area, when an area is present that is apparently not used by the thread to be surveyed, among the areas supplied by the OS 203 for communication among processes, the area is also recorded. An "inter-process communication area" is an area to execute communication among plural processes and is supplied by the OS 203 using an application programming interface (API), etc. The memory spaces are generally independent among the processes and a process can not directly access the memory spaces of other processes. Therefore, when information is transmitted and received among the processes, each of the processes transmits and receives information using the inter-process communication area. For example, the OS 203 establishes a chunk that is an aggregate of memory spaces, and supplies the chunk as inter-process communication areas, to the processes.

Reference numeral "801" denotes a program that is the origin of the process A. The ESL simulator results from the survey. The program is changed such that information concerning threads that do not share data and information concerning inter-process communication areas that are not used are registered in the dependency information 501 when such a thread is started up during the execution of the process A. The compiler compiles the changed program and produces execution code. For example, in FIG. 8, no shared data is present that is commonly accessed by the threads A-1 and A-2 and therefore, the ESL simulator additionally writes into the program of the process A that no dependency exists between the threads A-1 and A-2.

The OS 203 registers into the dependency information 501, the information concerning the threads that do not share data. In a dependency relation 802 concerning the dependency among the threads of the process A depicted in FIG. 8, "no dependency" is registered for the threads A-1 and A-2. The OS 203 expands a thread data structure as the dependency information 501 that manages the information concerning the threads that do not share any data and unused inter-process communication area. The expanded thread data structure will be described with reference to FIG. 9.

Figure 9:
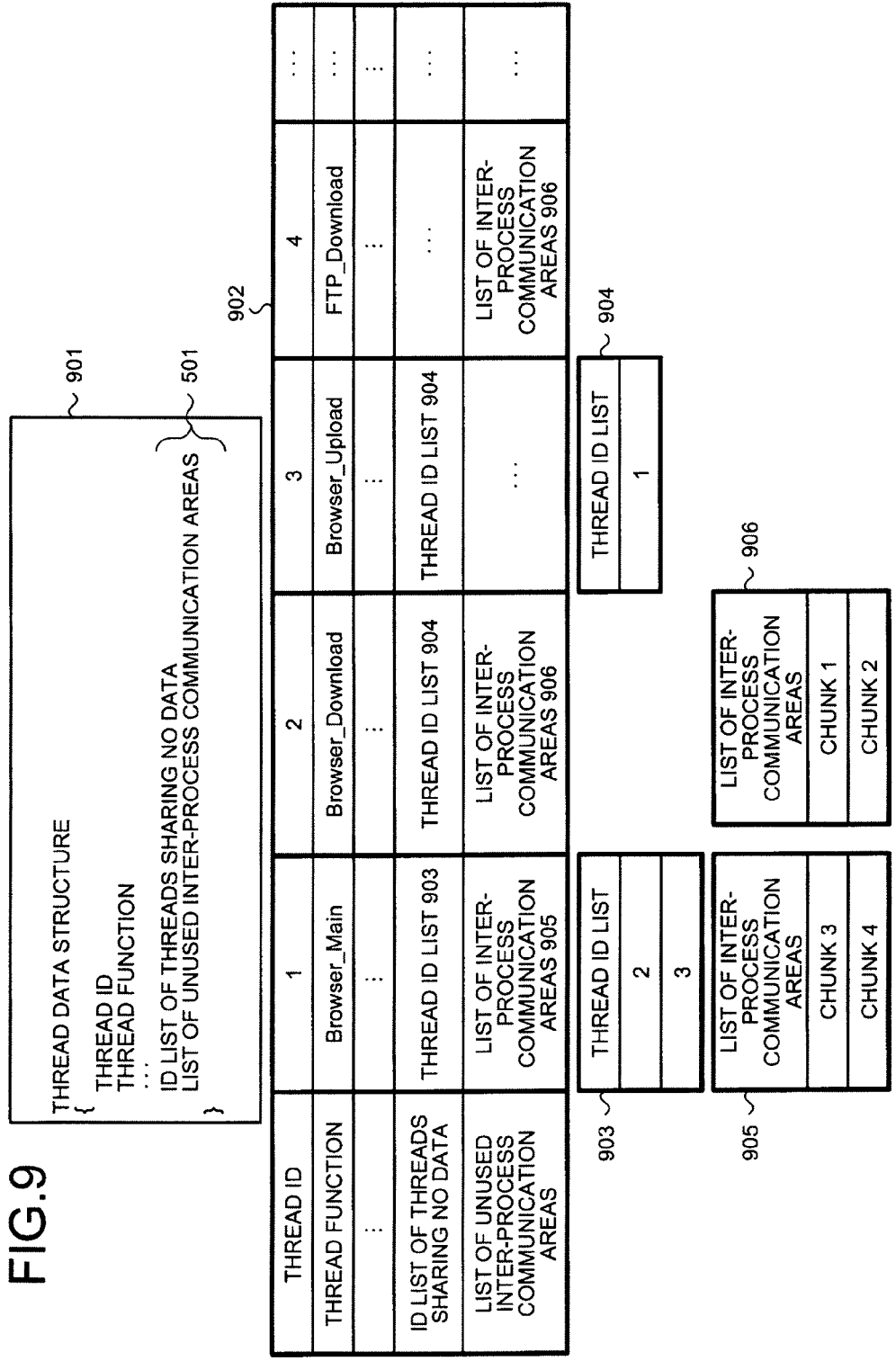
FIG. 9 is a diagram for explaining a list of members and an example of the content of an expanded thread data structure 901.

FIG. 9 is a diagram for explaining a list of members and an example of the content of the expanded thread data structure 901. FIG. 9 depicts a table 902, thread ID lists 903 and 904, and lists of inter-process communication areas 905 and 906 as an example of the expanded thread data structure 901 and the content thereof.

A thread ID field of the thread data structure 901 indicates a value that is collected for each thread. A thread function field indicates the name of a function of the corresponding thread. In addition, a field that is present in the conventional thread data structure is included in the thread data structure 901. Such list fields are expanded in the embodiment as an ID list field of threads sharing no data and a list field of unused inter-process communication areas; the list fields are elements of the dependency information 501.

The ID list field of threads sharing no data has pointers to an ID list of threads sharing no data with the thread to be executed. For example, in the table 902, for a "Browser_Main" thread whose thread ID is "1", the thread ID list 903 is set in the ID list field of threads sharing no data. The thread ID list 903 has threads registered therein whose thread IDs are "2" and "3". Thereby, it is known that the "Browser_Main" thread does not share data with a "Browser_Download" thread whose thread ID is "2" and a "Browser_Upload" thread whose thread ID is "3".

Similarly, the thread ID list 904 is set in the ID list field of threads sharing no data for "Browser_Download" thread. Based on the content of the thread ID list 904, it is known that the "Browser_Download" thread does not share data with the "Browser_Main" thread.

The list field of unused inter-process communication areas has pointers to a list of the inter-process communication areas not used by the threads. For example, for the "Browser_Main" thread, the list field of unused inter-process communication areas has the list of inter-process communication areas 905 set therein. The list of inter-process communication areas 905 has chunks 3 and 4 registered therein.

For an "FTP_Download" thread whose thread ID is "4" and that is executed as a process different from the "Browser_Main" thread, the list field of unused inter-process communication areas has a list of inter-process communication areas 906 set therein. The list of inter-process communication areas 906 has chunks 1 and 2 registered therein. When the chunks established by the OS 203 are the chunks 1 to 4, no area is present that is commonly used for communication among the processes in the lists of inter-process communication areas 905 and 906.

As described with reference to FIG. 9, the OS 203 manages the threads using the thread data structure 901. However, similarly, the OS 203 may manage the processes each of which is an aggregate of threads. The OS 203 may also produce a list of unused inter-process communication areas for each process.

Figure 10:
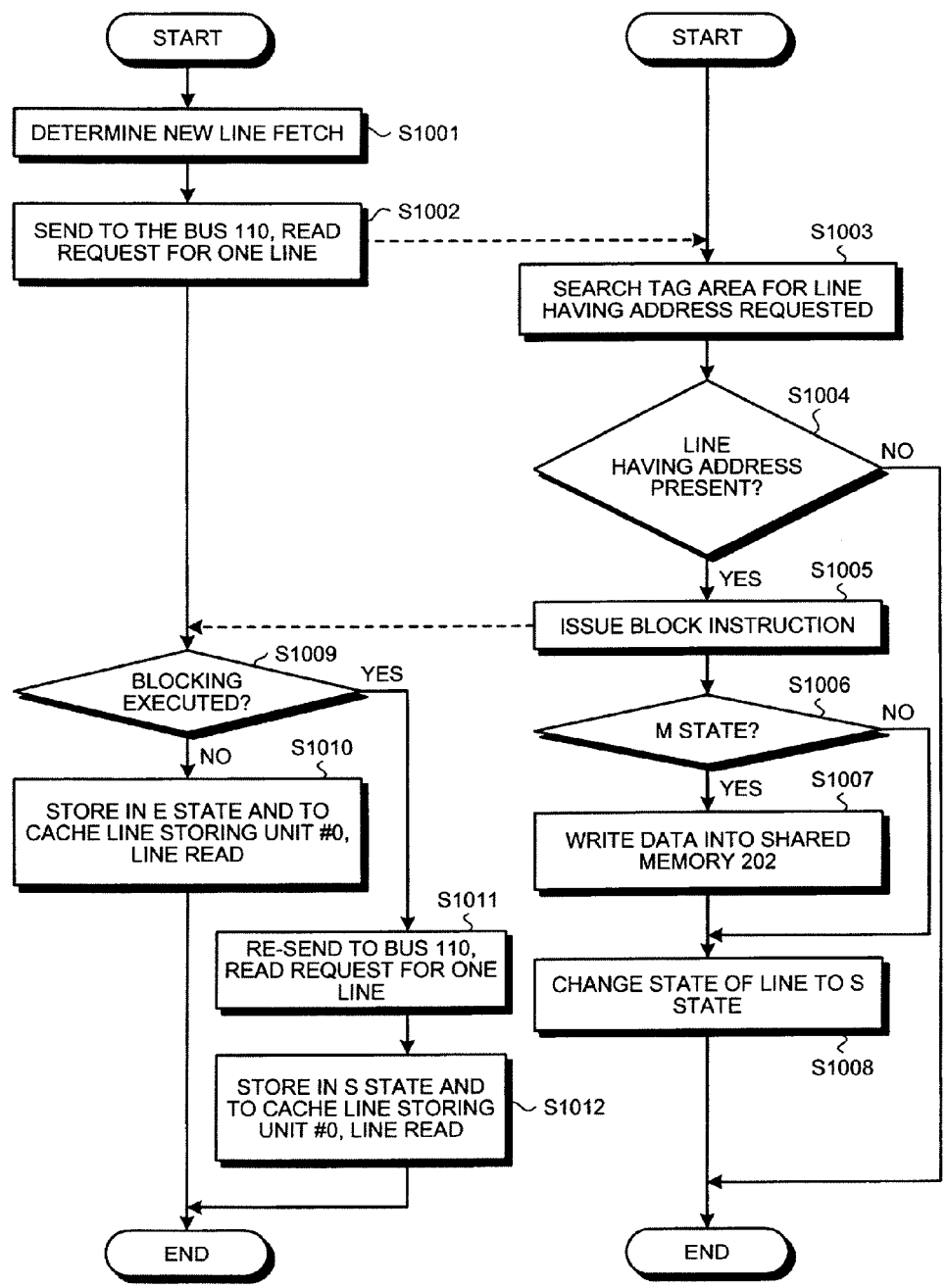
FIG. 10 is a flowchart of a line fetch process executed by a snoop control unit #0.

FIG. 10 is a flowchart of a line fetch process executed by the snoop control unit #0. It is assumed in FIG. 10 that the snoop supporting cache #0 receives a read request for a cache, from the CPU #0; the cache requested by the CPU #0 is not present in the cache line storing unit #0; and a line fetch process is executed by the snoop control unit #0. Other than the snoop control unit #0, each of the snoop control units #1 to #3 also executes the line fetch process according to a read request from the corresponding CPU.

The snoop control unit #0 determines a new line fetch (step S1001). After the determination, the snoop control unit #0 broadcasts from the master I/F #0 to the bus 110, a read request for one line (step S1002).

The snoop control units #1 to #3 each receives the read request and each starts a response for the line fetch process. The snoop control units #1 to #3 all execute the same process and therefore, in the description below, description will be made with respect to the snoop control unit #1 for simplicity. The snoop control unit #1 searches a tag area of the cache line storing unit #1, for the presence of a line having an address coinciding with the address requested (step S1003). When a line having a coinciding address is searched for, the search is started with lines in states other than the I state, which is an invalid state.

After the search, the snoop control unit #1 determines whether a line having a coinciding address is present (step S1004). If the snoop control unit #1 determines that no line having a coinciding address is present (step S1004: NO), the snoop control unit #1 causes the response to the line fetch process to come to an end. If the snoop control unit #1 determines that a line having a coinciding address is present (step S1004: YES), the snoop control unit #1 issues a block instruction to the transmission origin of the read request that is the snoop control unit #0 in the example of FIG. 10 (step S1005).

Subsequently, the snoop control unit #1 determines whether the state of the coinciding line is in the M state (step S1006). If the snoop control unit #1 determines that the state of the coinciding line is the M state (step S1006: YES), the snoop control unit #1 writes data of the coinciding line, into the shared memory 202 (step S1007). After this writing or if the snoop control unit #1 determines that the state of the retrieved line is a state other than the M state (step S1006: NO), the snoop control unit #1 changes the state of the line to the S state (step S1008) and causes the response to the line fetch process to come to an end.

The snoop control unit #0 determines whether blocking is executed according to a block instruction from any one of the snoop control units #1 to #3 (step S1009). When the snoop control unit #0 determines that no blocking is executed (step S1009: NO), the snoop control unit #0 stores to the cache line storing unit #0, the line read in the E state (step S1010) and causes the line fetch process to come to an end. If the snoop control unit #0 determines that blocking has been executed (step S1009: YES), the snoop control unit #0 re-sends to the bus 110, the read request for one line (step S1011). Subsequently, the snoop control unit #0 stores to the cache line storing unit #0, the line read in the S state (step S1012) and causes the line fetch process to come to an end.

Figure 11:
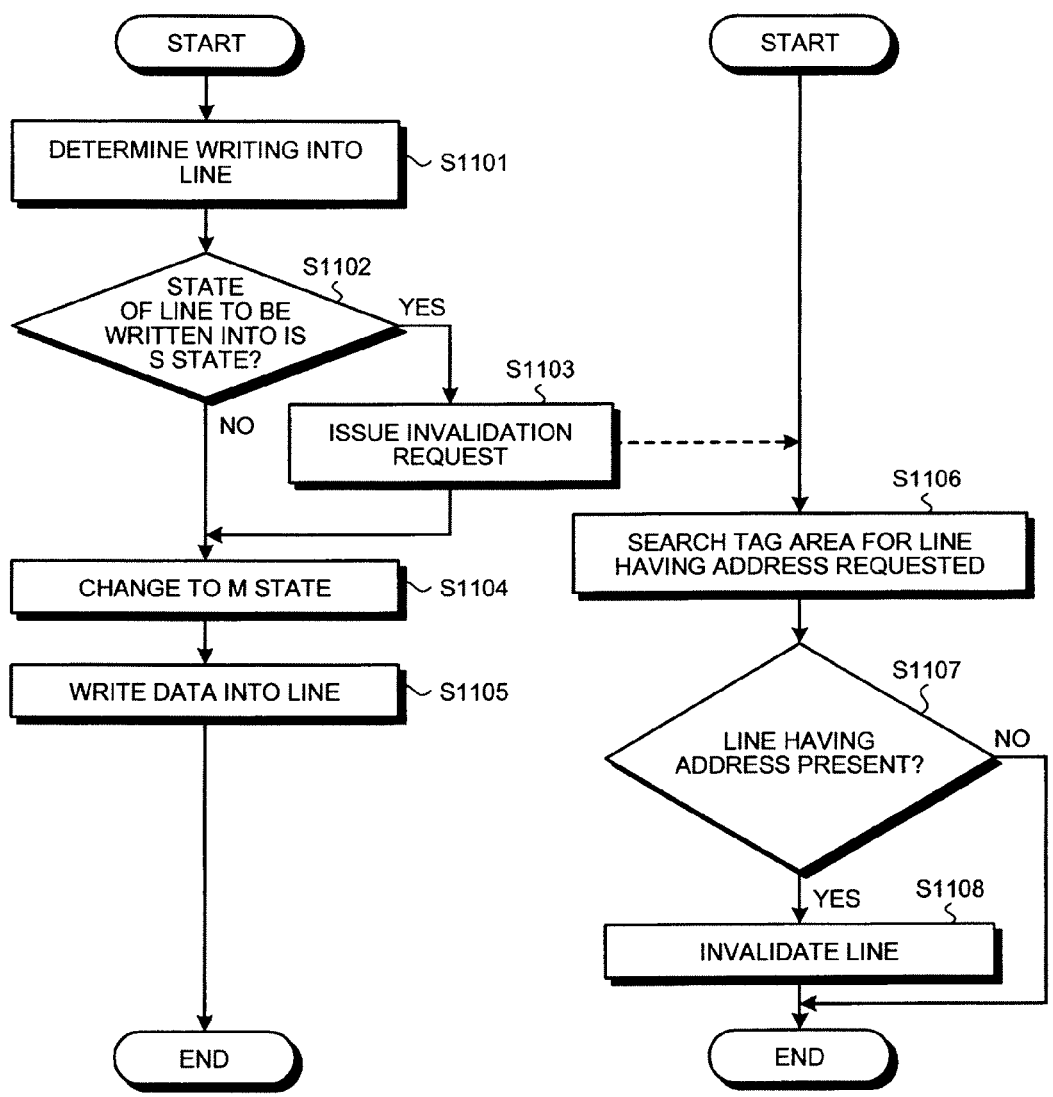
FIG. 11 is a flowchart of a writing process that is for writing into a line and executed by the snoop control unit #0.

FIG. 11 is a flowchart of a writing process that is for writing into a line and executed by the snoop control unit #0. It is assumed in FIG. 11 that the snoop supporting cache #0 receives a writing request for a cache, from the CPU #0. Other than the snoop control unit #0, each of the snoop control units #1 to #3 also executes the writing process according to a write request from the corresponding CPU.

The snoop control unit #0 determines writing into a line (step S1101). After the determination, the snoop control unit #0 determines whether the state of a line that is to be written into is the S state (step S1102). If the snoop control unit #0 determines that the state of the line is the S state (step S1102: YES), the snoop control unit #0 issues and broadcasts an invalidation request to the snoop control units #1 to #3 (step S1103). After transmitting the invalidation request or if the snoop control unit #0 determines that the state of the line is not the S state (step S1102: NO), the snoop control unit #0 changes to the M state, the state of the line that is to be written into (step S1104). After the changing, the snoop control unit #0 writes data into the line that is to be written into (step S1105) and causes the writing process to come to end.

The snoop control units #1 to #3 each receives the invalidation request in the process at step S1103 and each starts a response for the writing process. The snoop control units #1 to #3 all execute the same process and therefore, in the description below, description will be made with respect to the snoop control unit #1, for simplicity.

The snoop control unit #1 searches the tag area of the cache line storing unit #1, for the presence of a line having an address that coincides with the address requested (step S1106). When a line having a coinciding address is searched for, the search is started with lines in states other than the I state, which is the invalid state. After the search, the snoop control unit #1 determines whether a line having a coinciding address is present (step S1107). If the snoop control unit #1 determines that a line having a coinciding address is present (step S1107: YES), the snoop control unit #1 invalidates the line by setting the line to the I state (step S1108). After the invalidation of the line or if the snoop control unit #1 determines that a line having a coinciding address is not present (step S1107: NO), the snoop control unit #1 causes the writing process to come to an end.

Figure 12:
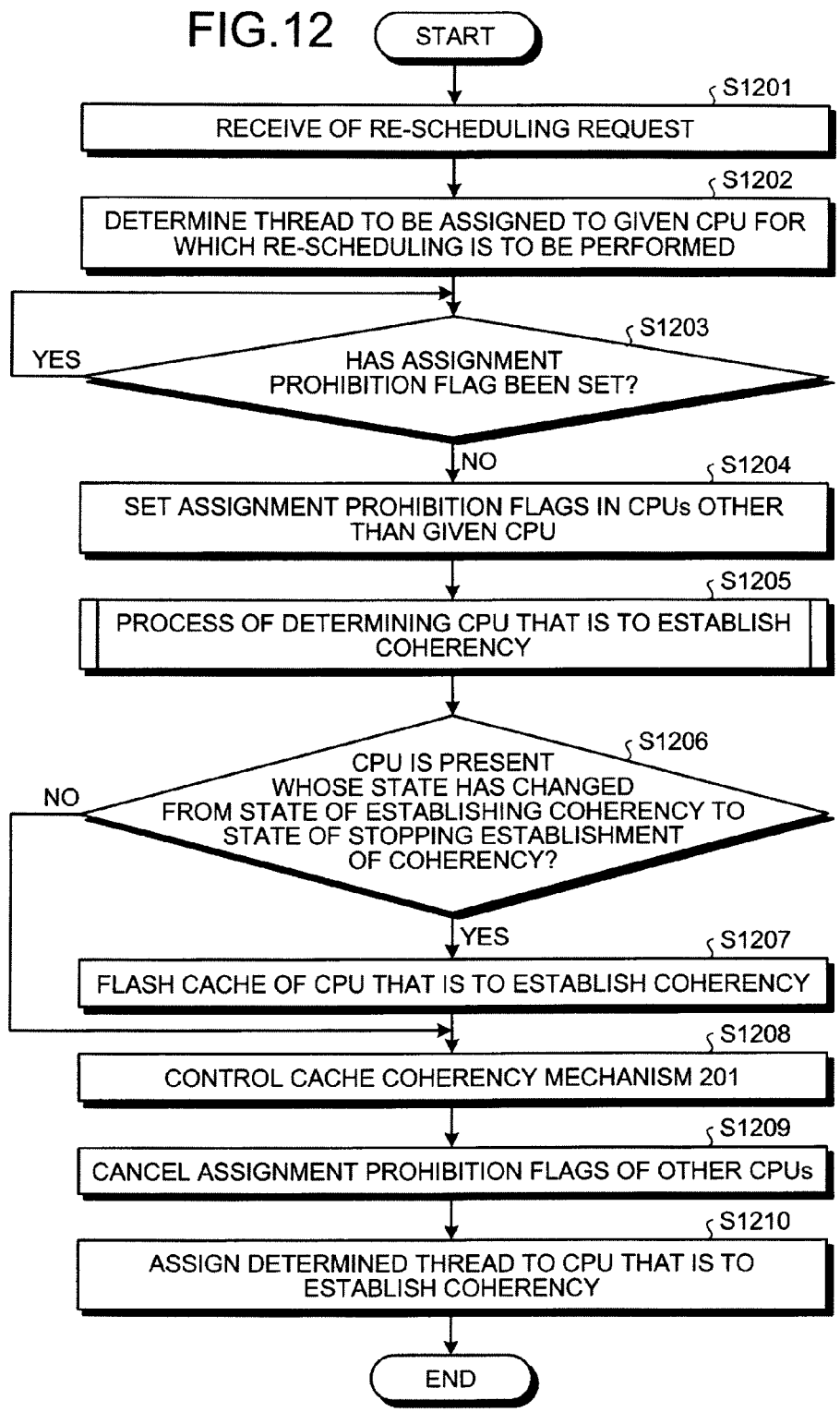
FIG. 12 is a flowchart of a coherency control process.

FIG. 12 is a flowchart of a coherency control process. The coherency control process is executed by a CPU among the CPUs #0 to #3. A case where the coherency control process is executed by the CPU #0 will be described with reference to FIG. 12.

The CPU #0 detects receipt of a re-scheduling request (step S1201). The coherency control process is executed each time a thread is re-scheduled. Therefore, the coherency control process may reside inside the scheduler 502 or outside the scheduler 502, in a state enabling communication with the scheduler 502. The CPU #0 determines the thread to be assigned to the CPU for which the re-scheduling is to be performed (step S1202). The CPU may be the CPU #0 or when the scheduler 502 also executes the scheduling process for another CPU, may be another CPU that receives the re-scheduling request.

After the determination, the CPU #0 determines whether an assignment prohibition flag has been set (step S1203). If the CPU #0 determines that an assignment prohibition flag has been set (step S1203: YES), the CPU #0 again executes step S1203 after a specific time period. If the CPU #0 determines that no assignment prohibition flag has been set (step S1203: NO), the CPU #0 sets the assignment prohibition flag in a CPU other than the CPU for which the re-scheduling is performed (step S1204).

After setting the assignment prohibition flag, the CPU #0 executes a process of determining a CPU that is to establish coherency (step S1205). The process of determining the CPU that is to establish coherency will be described in detail with reference to FIG. 13. After the determination, the CPU #0 determines whether a CPU is present whose state has changed consequent to the process of determining the CPU that is to establish coherency, from a state where the CPU establishes coherency to a state where the CPU stops establishing coherency (step S1206). If the CPU #0 determines that a CPU is present whose state has changed (step S1206: YES), the CPU #0 flashes the cache of the CPU that is to establish coherency (step S1207). "Flashing" is an operation, for example, for the snoop control unit to write a line whose data has been updated into the shared memory 202 and sets all the lines including those in the M state to be in the I state.

After the flashing or if the CPU #0 determines that no CPU is present whose state is changed (step S1206: NO), the CPU #0 controls the cache coherency mechanism 201 (step S1208). It is assumed that the control includes the CPU #0 determining, in the process at step S1205, that the CPU that is to establish coherency is the CPU #0 and execution of establishing (i.e., maintaining) coherency by the CPUs #0 and #1 is stopped.

In this case, the CPU #0 instructs the snoop supporting cache #0 to exclude the snoop supporting cache #1 from the broadcast destinations. For example, the CPU #0 changes a setting register of the snoop supporting cache #0 and thereby, excludes the snoop supporting cache #1 from the broadcast destinations.

Similarly, the CPU #0 also instructs the snoop supporting cache #1 to exclude the snoop supporting cache #0 from the broadcast destinations. This exclusion of the snoop supporting cache #0 from the broadcast destinations can reduce the amount of transmission by the broadcasting executed in the processes at steps S1002 and S1103 and can reduce the amount of traffic in the bus 110. The snoop supporting caches excluded from the broadcast destinations also do not have to execute response processes and thereby, enabling a reduction in the amount of processing thereof.

After the control, the CPU #0 cancels the assignment prohibition flags of the other CPUs (step S1209) and assigns the determined threads to the CPU that is to establish coherency (step S1210). After the assignment, the CPU #0 causes the coherency control process to come to an end.

Figure 13:
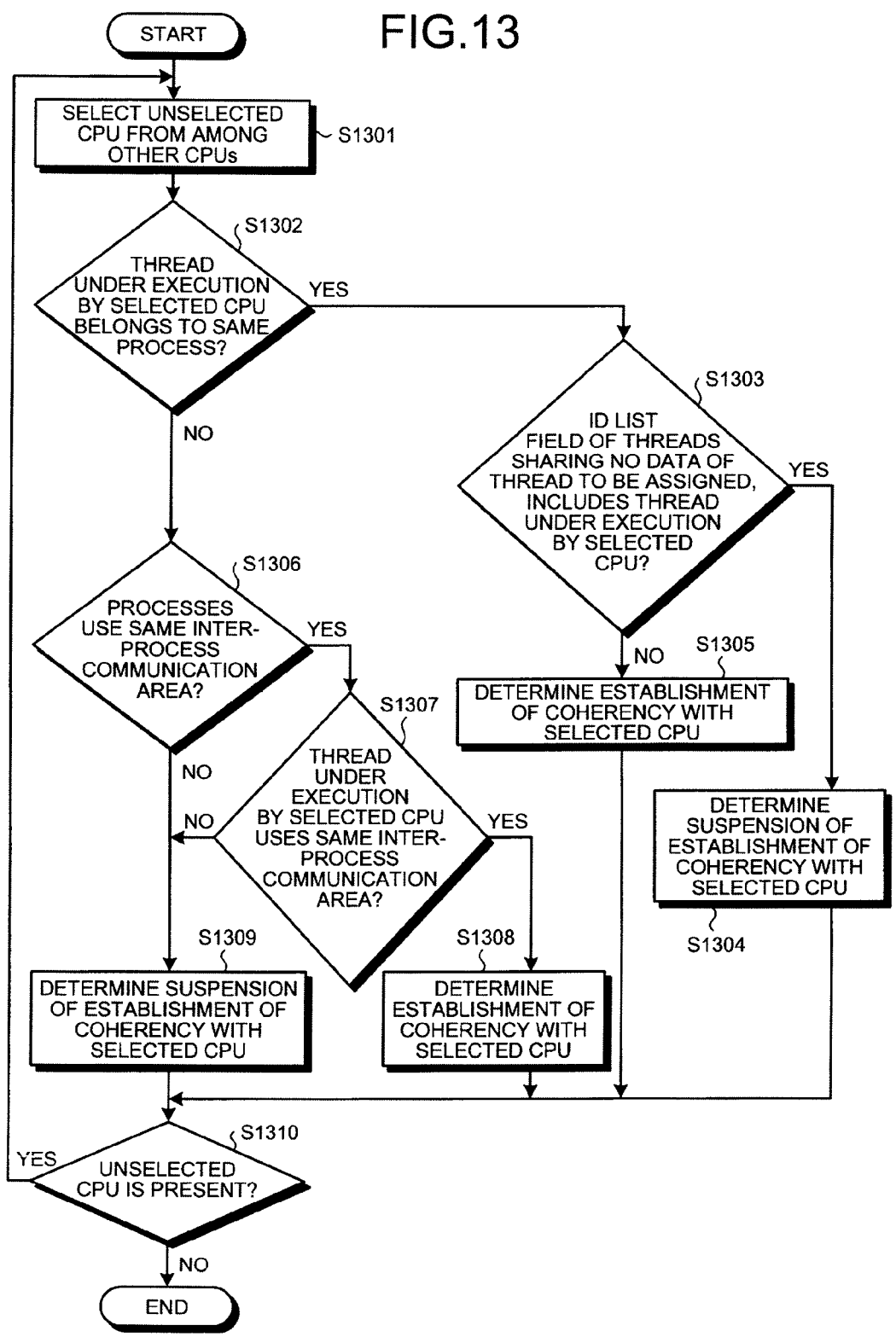
FIG. 13 is a flowchart of a process of determining a CPU that is to establish coherency.

FIG. 13 is a flowchart of a process of determining a CPU that is to establish coherency. As with the coherency control process, the process of determining a CPU that is to establish coherency is also executed by any CPU among the CPUs #0 to #3. Similarly to FIG. 12, a case will be described with reference to FIG. 13 where the CPU #0 executes the process of determining a CPU that is to establish coherency. The process of determining a CPU that is to establish coherency acquires from the coherency control process and as an argument, the CPU that is to establish coherency and the thread that is to be assigned.

The CPU #0 selects an unselected CPU from among CPUs other than the CPU that is to establish coherency (step S1301). After the selection, the CPU #0 determines whether the process to which the thread to be assigned belongs and the process to which the thread under execution by the selected CPU belongs are same process (step S1302).

If the CPU #0 determines that the processes are same (step S1302: YES), the CPU #0 determines whether the ID list field of threads sharing no data of the thread to be assigned, includes the thread under execution by the CPU selected (step S1303). If the CPU #0 determines that the ID list field includes the thread (step S1303: YES), the CPU #0 determines suspension of the establishment of coherency between the CPU that is to establish coherency and the selected CPU (step S1304). If the CPU #0 determines that the ID list field does not include the thread (step S1303: NO), the CPU #0 determines establishment of coherency between the CPU that is to establish coherency and the selected CPU (step S1305).

If the CPU #0 determines that the process to which the thread to be assigned belongs and the process to which the thread under execution by the CPU selected belongs are not the same process (step S1302: NO), the CPU #0 determines whether these processes use the same inter-process communication area (step S1306). If the CPU #0 determines that these processes use the same inter-process communication area (step S1306: YES), the CPU #0 determines whether the thread to be assigned and the thread under execution by the selected CPU use the same inter-process communication area (step S1307).

If the CPU #0 determines that the threads use the same inter-process communication area (step S1307: YES), the CPU #0 determines establishment of coherency between the CPU that is to establish coherency and the selected CPU (step S1308). If the CPU #0 determines that the threads do not use the same inter-process communication area (step S1306: No, step S1307: NO), the CPU #0 determines suspension of the establishment of coherency between the CPU that is to establish coherency and the selected CPU (step S1309).

After the process at any one of steps S1304, S1305, S1308, and S1309, the CPU #0 determines whether an unselected CPU is present among the CPUs other than the CPU that is to establish coherency (step S1310). If the CPU #0 determines that an unselected CPU is present (step S1310: YES), the CPU #0 progresses to the process at step S1301. If the CPU #0 determines that no unselected CPU is present (step S1310: NO), the CPU #0 causes the process of determining a CPU that is to establish coherency to come to an end.

As described, according to the multi-core processor system, the cache coherency control method, and a cache coherency control program, it is determined whether areas that are accessed by the first and the second threads under execution by the first and the second cores are different areas. If it is determined that the areas are different areas, the multi-core processor system causes the establishment of coherency to be stopped for the first cache memory corresponding to the first core and the second cache memory corresponding to the second core. Because the areas accessed are different from each other, no incoherency occurs between the shared data even if the establishment of coherency is caused to be stopped. Therefore, the amount of traffic of the cache coherency mechanism is reduced, whereby the multi-core processor system can reduce its power consumption and can prevent any delay caused by an increase of the amount of traffic.

The multi-core processor system may cause the establishment of coherency to be stopped if it is determined that the first and the second threads belong to the same process and no shared data is present that is commonly accessed by the first and the second threads. Thus, even when two cores execute threads of the same process, the multi-core processor system can reduce the amount of traffic of the cache coherency mechanism as well as power consumption. For an embedded device such as a mobile telephone, a case where multiple processes are simultaneously started up is rare and plural threads belonging to the same process are often executed. Therefore, the embodiment is especially effective for such a device.

Among the embedded OSs residing on embedded devices, an OS is also present that has no concept of process; according to which all threads (tasks) access the same memory space; and that is, for example, "μITRON" described in: Embedded OS Tekizai-Tekisho <<Windows (a registered trade mark) Embedded CE Edition>> (1)—First, μITRON and Windows (a registered trade mark) Understanding Difference of Embedded CE|Tech Village/CQ Shuppan Co., Ltd.: [online], [retrieved on May 13, 2010], the Internet <URL: http://www.kumikomi.net/archives/2009/09/itron-windows_embed ded_ceoswindows_embedded_ce1.php?page=2>.

On the above OS, all the threads can access all the memory spaces and therefore, coherency is always established even when the conventional approach is applied. However, according to the multi-core processor system 100 in the embodiment, when it is determined that no shared data is present that is commonly accessed, the amount of traffic and the amount of processing of the cache coherency mechanism can be reduced and therefore, the multi-core processor system 100 is especially effective.

The multi-core processor system may cause the establishment of coherency to be stopped when the first and the second threads belong to processes that are different from each other and no area that is commonly used by the first and the second threads is present for communication among the processes. Thus, the multi-core processor system causes the establishment of coherency to be stopped and thereby, can reduce the amount of traffic, processing, and power consumption, and can prevent any delay caused by an increase of the amount of traffic, except in a case where coherency needs to be established even for different processes.

The multi-core processor system may determine whether an inter-process communication area is present that is commonly used by processes to which the first and the second threads belong. When the multi-core processor system determines whether an inter-process communication area is present that is commonly used by the first and the second threads, the multi-core processor system first may determine a state where at least one of the first and the second threads does not use the inter-process communication area.

The determination of whether an area for communication among the processes is used requires a smaller amount of processing than a determination of whether an inter-process communication area is present that is commonly used. Therefore, the overall amount of processing can be reduced by following a processing order of first determining whether the first and the second threads use the inter-process communication area; and if it is determined that both of the threads use the area, determining whether any area is present that is commonly used.

When the multi-core processor system causes the establishment of coherency to be stopped for the first and the second cache memories, the multi-core processor system may delete from the first cache memory, the shared data stored therein. Thereby, the multi-core processor system can establish coherency of the shared memory even when the multi-core processor system causes the establishment of coherency to be stopped.

The cache coherence method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising a processor configured to:
    establish coherency of shared data values stored in a cache memory accessed by a plurality of cores;
    detect a first thread executed by a first core among the cores;
    identify upon detecting the first thread, a second thread under execution by a second core other than the first core and among the cores;
    determine whether shared data commonly accessed by the first thread and the second thread is present; and
    stop establishment of coherency for a first cache memory corresponding to the first core and a second cache memory corresponding to the second core, upon determining that no shared data commonly accessed is present.

2. The multi-core processor system according to claim 1, wherein
    the processor further determines whether the first and the second threads belong to the same process, and
    the processor upon determining that the first and the second belong to the same process and that no shared data commonly accessed is present, stops the establishment of coherency for the first cache memory and the second cache memory.

3. The multi-core processor system according to claim 1, wherein
    the processor determines whether the first and the second threads belong to respectively different processes and whether an inter-process communication area commonly used by the first and the second threads is present, and the processor upon determining that the first and the second threads belong to respectively different processes and that no inter-process communication area commonly used is present, stops the establishment of coherency for the first cache memory and the second cache memory.

4. The multi-core processor system according to claim 1, wherein the processor, when stopping the establishment of coherency for the first cache memory and the second cache memory, causes the shared data stored in the first cache memory to be deleted from the first cache memory.

5. A cache coherency control method executed by a first core among a plurality of cores capable of controlling a cache coherency mechanism that establishes coherency among shared data values stored in a cache memory accessed by each of the cores, the cache coherency control method comprising:

detecting a first thread executed by the first core;

identifying, when at the detecting the first thread is detected, a second thread under execution by a second core other than the first core and among the cores;

determining whether shared data commonly accessed by the first thread and the second thread is present; and causing, when at the determining no shared data commonly accessed is determined to be present, establishment of coherency for a first cache memory corresponding to the first core and a second cache memory corresponding to the second core, to stop.

6. A non-transitory computer-readable recording medium storing a program that causes a first core among a plurality of cores capable of controlling a cache coherency mechanism that establishes coherency among shared data values stored in a cache memory accessed by each of the cores, to execute a cache coherency control process comprising:

detecting a first thread executed by the first core;

identifying, when at the detecting the first thread is detected, a second thread under execution by a second core other than the first core and among the cores;

determining whether shared data commonly accessed by the first thread and the second thread is present; and causing, when at the determining no shared data commonly accessed is determined to be present, establishment of coherency for a first cache memory corresponding to the first core and a second cache memory corresponding to the second core, to stop.

* * * * *